(No Model.)

T. GREEN.
CALIPERS AND DIVIDERS.

No. 396,479. Patented Jan. 22, 1889.

WITNESSES:
C. Neveux
C. Sedgwick

INVENTOR:
T. Green
BY Munn & Co
ATTORNEYS.

UNITED STATES PATENT OFFICE.

THOMAS GREEN, OF EAST DAVENPORT, IOWA.

CALIPERS AND DIVIDERS.

SPECIFICATION forming part of Letters Patent No. 396,479, dated January 22, 1889.

Application filed July 13, 1888. Serial No. 279,837. (No model.)

*To all whom it may concern:*

Be it known that I, THOMAS GREEN, of East Davenport, in the county of Scott and State of Iowa, have invented a new and Improved Measuring and Drawing Instrument, of which the following is a full, clear, and exact description.

The object of the invention is to provide a new and improved measuring and drawing instrument specially adapted for mechanics and to be used as inside and outside calipers, dividers, &c.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1:
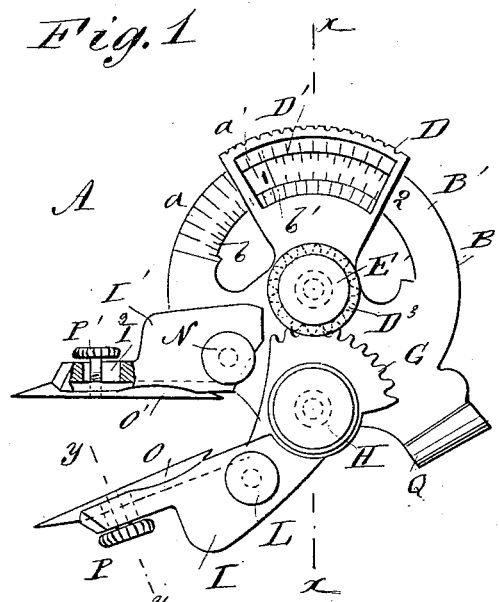
Figure 2:
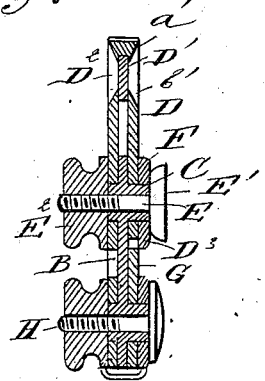
Figure 4:
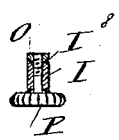
Figure 3:
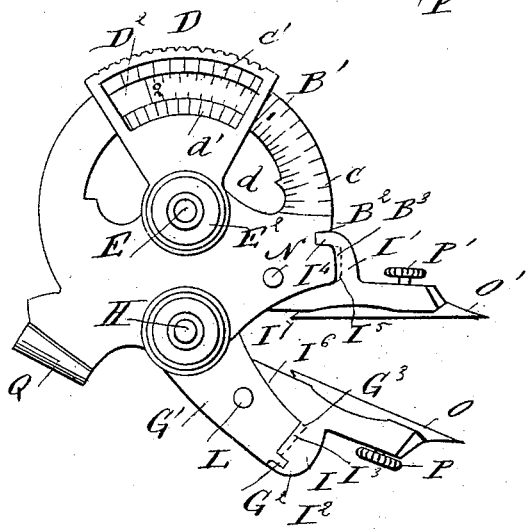
Figure 5:
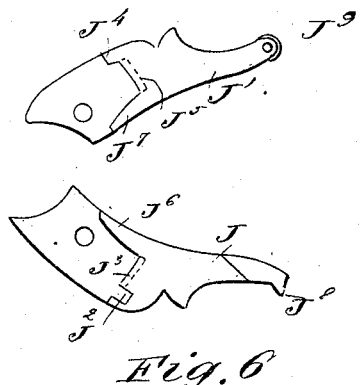
Figure 6:
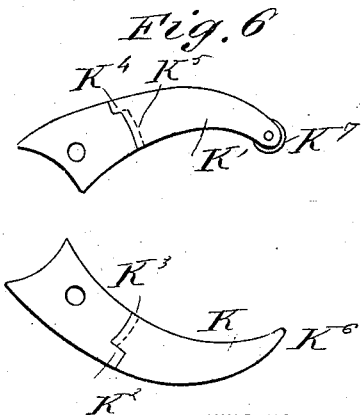

Figure 1 is a front face view of the improvement with parts in section and adapted as dividers. Fig. 2 is a transverse section of the same on the line $x\ x$ of Fig. 1. Fig. 3 is a rear face view of the same. Fig. 4 is a sectional end elevation of part of the improvement on the line $y\ y$ of Fig. 1. Fig. 5 is a face view of a set of inside calipers to be used in connection with the instrument, and Fig. 6 is a like view of a set of outside calipers to be used in connection with the instrument.

The improved measuring and drawing instrument A is provided with a plate, B, in the center of which, on each side, is formed a hub, C, on which is mounted to turn the indicator D, consisting of a U-shaped plate fitting over the sides of the plate B and onto the said hub C on each side of the said plate B, as is plainly shown in Figs. 1 and 2. The upper part of the indicator D is segmental, and fits onto the segmental part B' of the plate B.

The indicator D is held in place by a bolt, E, passing through the center of the hub C, its head E' resting on the washer F, pressed against the outer face of one of the arms of the indicator D. On the bolt E screws the nut $E^2$ against the other arm of the indicator D. By adjusting the nut $E^2$ the indicator is permitted to turn freely on the hub C, or is fastened in place in any desired position when screwing up the nut $E^2$.

The indicator D is provided on one arm near its upper end with the slots D' and $D^2$, arranged segmentally and directly over the face of the segmental part B' of the plate B. On the upper edge of the slot D' is formed a graduation, $a'$, indicating over a graduation, $a$, formed on the outer edge of the front part of the portion B' of the plate B. A similar graduation, $b$, is formed on the inner edge of the part B', and on it indicates a graduation, $b'$, formed on the lower edge of the slot D', as is plainly shown in Fig. 1. Similar graduations, $c$ and $c'$ and $d$ and $d'$, are formed on the rear faces of the part B' and the indicator D in the slot $D^2$. The graduations $a$ and $b$ may be of two different systems, indicating linear measurement—such as inches, for instance, and centimeters—and in a like manner the graduations $c$ and $d$ on the rear face of the part B' of the plate B may indicate inches and centimeters and subdivisions thereof.

On the front arm of the indicator D are formed gear-teeth $D^3$, arranged in a circle of which the bolt E is the center. Said gear-teeth $D^3$ mesh into a segmental gear-wheel, G, mounted to turn on a bolt, H, secured in the plate B. The segmental gear-wheel G is also provided with an arm, G', extending in an opposite direction from its teeth, and adapted to carry the pointer-arm I or the inside or outside caliper-arms, J and K, illustrated in Figs. 5 and 6. The arms I, J, and K are fastened to the arm G' by means of a bolt passing through the respective arm I, J, or K and screwing into the arm G'. On the latter is formed the downwardly-projecting lug $G^2$, fitting into a corresponding recess or notch, $I^2$, $J^2$, or $K^2$, in the arms I, J, and K. The outer end, $G^3$, of the arm G' is beveled and fits into a corresponding under-cut, $I^3$, $J^3$, or $K^3$, formed in the arms I, J, and K. Thus, when the arms I, J, and K are placed on the arm G', the dovetails fit into the beveled end $G^3$ and the lug $G^2$ projects into the respective notch $I^2$, $J^2$, or $K^2$, so that when the operator screws up the bolt L the respective arm I, J, or K is held firmly in place on the said arm G'.

The arms I', J', and K' of the dividers, inside calipers, and outside calipers are adapted to be secured to the fixed plate B by means of a bolt, N, passing through the respective arm I', J', or K', and screwing into the plate B. In order to hold the respective arms I', J', and K' in place, I provide the plate B with a notch, B², into which fits the corresponding lug I⁴, J⁴, or K⁴, formed on the arms I', J', and K'. Part of the periphery of the plate B is beveled, as at B³, and onto its bevel fits a corresponding under-cut, I⁵, J⁵, or K⁵, of the arms I', J', and K'. Thus, when the arm is placed in position on the plate B, the lug I⁴, J⁴, or K⁴ fits into the notch B² and the under-cut I⁵, J⁵, or K⁵ fits onto the bevel B³, and when the operator screws up the bolt N the respective arm is securely held in place on the plate B.

The inner edges of the arms I and I' are provided with a V-shaped groove, I⁸, into which fits a similarly-shaped point, O or O', respectively held in place by a bolt, P or P', passing through a slot, I⁹, in the said arm I or I', and screwing into the said point O or O', respectively. The head of the bolt P or P' screws against the back of the arm I or I', so as to clamp the point O or O' firmly in place on the arm I or I'. The slot I⁹ serves for adjusting the points O and O' to the proper place when worn out or sharpened.

The inside caliper-arm, J, is provided with a point, J⁸, extending outward, and on the other inside caliper-arm, J', is formed a friction-wheel, J⁹. In a similar manner the outside caliper-arms, K and K', are provided with an inwardly-extending point, K⁶, and a friction-wheel, K⁷, at its outer ends. The arms I I' and J J' are also additionally provided with projecting sides I⁶ I⁷ and J⁶ J⁷, fitting on the inside of the arm G' of the plate B when placed in position on the latter. On the plate B is also formed a thumb-rest, Q, for conveniently adjusting the indicator D, when necessary.

The operation is as follows: When the divider-arm I' is secured by means of the bolt M to the fixed plate B and the divider-arm I is secured to the segmental arm G' by means of the bolt L, then the instrument forms a divider, and is used for all purposes for which dividers are commonly employed. In order to open or close the divider-points O and O', the operator takes hold of the plate B and moves the indicator D, so that the latter swings on the hub C of the plate B, whereby the points O and O' move toward and from each other. When the desired distance between the outer ends of the points O and O' is attained, the graduation $a'$ indicates on the graduation $a$ the exact distance in inches between the outer ends of the points O and O'. The graduation $b'$ on the indicator D indicates on the graduation $b$ the distance between the points O and O' in centimeters, or whatever measurement is indicated by the said graduations. When the inside caliper-arm J' is secured to the plate B, instead of the divider-arm I', and the inside caliper-arm J is secured to the segmental arm G', instead of the arm I, the instrument forms an inside caliper, and is used as such for inside calipering. The operation is the same as above described in reference to the dividers—that is, the indicator D is turned on its hub C until the point J⁸ and the wheel J⁹ rest against the parts to be calipered. The distance between the point J⁸ and the outer part of the wheel J⁹ is indicated either in inches or centimeters on the graduations $c$ and $d$ on the rear of the plate B.

In order to form an outside caliper, it is necessary to remove the arms J and J', and fasten, in lieu thereof, to the arm G' and the plate B the outside caliper-arms, K and K'. The arm G', carrying the arm K, is moved the desired distance by operating the indicator D in the same manner as described above in reference to the divider and the inside caliper. When the desired distance is reached—that is, when the point K⁶ and the wheel K⁷ touch the respective parts on both sides—the distance between the point K⁶ and the wheel K⁷ is indicated by the graduations $a$ and $b$ of the plate B.

Thus it will be seen that by a few slight changes I am enabled to change the instrument from a divider into an inside or outside caliper, and vice versa. It will further be seen that whatever distance is measured it is indicated on the graduations $a$, $b$, $c$, or $d$.

Having thus fully described my invention, I claim as new and desire to secure by Letters Patent—

1. In a measuring and drawing instrument, the combination, with a plate having a segmental graduated part and a fixed arm held on the said plate, of an indicator held to turn on the said plate over the said graduated part, a gear-wheel formed on the said indicator, a segmental gear-wheel in mesh with the said gear-wheel on the indicator and turning on the said plate, and an arm held on the said segmental gear-wheel and adapted to support divider-arms or inside or outside caliper-arms, substantially as shown and described.

2. In a measuring and drawing instrument, the combination, with a plate having a segmental graduated part, of an indicator held to turn on the said plate over the said graduated part, a gear-wheel formed on the said indicator, a segmental gear-wheel in mesh with the said gear-wheel and turning on the said plate, an arm held on the said segmental gear-wheel, and divider-arms held on the said fixed plate and segmental arm, substantially as shown and described.

3. In a measuring and drawing instrument, the combination, with a plate having a segmental graduated part, of an indicator held to turn on the said plate over the said graduated part, a gear-wheel formed on the said indicator, a segmental gear-wheel held in mesh with the said gear-wheel on the indicator and turning on the said plate, an arm held on the said segmental gear-wheel, and inside caliper-arms held on the said plate and the said segmental arm, substantially as shown and described.

4. In a measuring and drawing instrument, the combination, with a plate having a segmental graduated part, of an indicator held to turn on the said plate over the said graduated part, a gear-wheel formed on the said indicator, a segmental gear-wheel held in mesh with the said gear-wheel on the indicator and turning on the said plate, an arm held on the said segmental gear-wheel, and outside caliper-arms held on the said plate and on the segmental arm, substantially as shown and described.

5. In a measuring and drawing instrument, the combination, with a plate provided with a lug and a beveled part, of an arm secured to the said plate by a bolt and provided with a recess in which fits said lug, and also provided with an under-cut fitting onto the said bevel, substantially as shown and described.

6. In a measuring and drawing instrument, the combination, with a plate provided with a notch and a beveled part, of an arm secured to the said plate by a bolt and provided with a lug fitting into the said notch, and also provided with an under-cut fitting onto the said bevel, a segmental arm held to turn on the said plate, and an arm fastened to the said segmental arm by a bolt and provided with a notch fitting onto a lug on the said segmental arm, and also provided with an under-cut fitting on the bevel end of the said segmental arm, substantially as shown and described.

THOMAS GREEN.

Witnesses:
 JOHN D. SCHMIDT,
 HERSCHIL L. DE BATTIE.